United States Patent
Won et al.

(10) Patent No.: US 9,360,840 B2
(45) Date of Patent: Jun. 7, 2016

(54) COMPLEX SPATIAL LIGHT MODULATOR AND 3D IMAGE DISPLAY INCLUDING THE SAME

(71) Applicants: SAMSUNG ELECTRONICS CO., LTD., Suwon-si (KR); Korea University Research and Business Foundation, Seoul (KR)

(72) Inventors: Kang-hee Won, Seoul (KR); Hwi Kim, Seoul (KR); Gee-young Sung, Daegu (KR); Hoon Song, Yongin-si (KR); Jung-kwuen An, Cheonan-si (KR); Hong-seok Lee, Seongnam-si (KR)

(73) Assignees: SAMSUNG ELECTRONICS CO., LTD., Suwon-si (KR); Korea University Research and Business Foundation, Seoul (KR)

(*) Notice: Subject to any disclaimer, the term of this patent is extended or adjusted under 35 U.S.C. 154(b) by 11 days.

(21) Appl. No.: 14/340,065

(22) Filed: Jul. 24, 2014

(65) Prior Publication Data
US 2015/0205262 A1    Jul. 23, 2015

(30) Foreign Application Priority Data

Jan. 17, 2014    (KR) ........................ 10-2014-0006176

(51) Int. Cl.
*G03H 1/22* (2006.01)
*G02B 27/42* (2006.01)
*G02B 27/22* (2006.01)
*G03H 1/02* (2006.01)

(52) U.S. Cl.
CPC .......... *G03H 1/2294* (2013.01); *G02B 27/2214* (2013.01); *G02B 27/4205* (2013.01); *G03H 1/2205* (2013.01); *G03H 2001/0224* (2013.01); *G03H 2223/18* (2013.01); *G03H 2223/19* (2013.01); *G03H 2225/33* (2013.01); *G03H 2225/55* (2013.01)

(58) Field of Classification Search
CPC .. G02B 6/0038; G02B 6/0053; G02B 6/0036; G02B 6/0061; G02B 21/14; G03H 1/08; G03H 1/2294; G03H 1/22; F21S 48/1233; F21S 5/00; F21S 2101/02; H04N 9/3197
See application file for complete search history.

(56) References Cited

U.S. PATENT DOCUMENTS

| 2010/0195178 | A1 | 8/2010 | Leister et al. |
| 2011/0096381 | A1 | 4/2011 | Leister et al. |
| 2012/0092735 | A1 | 4/2012 | Futterer et al. |
| 2014/0300709 | A1* | 10/2014 | Futterer ............... G03H 1/2286 348/51 |

FOREIGN PATENT DOCUMENTS

| KR | 10-1107528 B1 | 1/2012 |
| KR | 10-2013-0094108 A | 8/2013 |

* cited by examiner

*Primary Examiner* — Jennifer L. Doak
(74) *Attorney, Agent, or Firm* — Sughrue Mion, PLLC

(57) ABSTRACT

Provided are a complex spatial light modulator and a three-dimensional (3D) image display including the same. The complex spatial light modulator includes a spatial light modulator configured to modulate a phase of a light beam, a prism array disposed after the spatial light modulator and including an array of prism portions each having a first prism surface and a second prism surface, and a diffractive device configured to diffract a light beam that has passed through the prism array. Accordingly, both the phase and amplitude of the light beam may be modulated.

20 Claims, 7 Drawing Sheets

$$Ae^{i\theta_1} + C + Be^{i\theta_2} = De^{i\theta}$$

COMPLEX SPATIAL LIGHT MODULATOR AND 3D IMAGE DISPLAY INCLUDING THE SAME

CROSS-REFERENCE TO RELATED APPLICATION

This application claims priority from Korean Patent Application No. 10-2014-0006176, filed on Jan. 17, 2014, in the Korean Intellectual Property Office, the disclosure of which is incorporated herein in its entirety by reference.

BACKGROUND

1. Field

Apparatuses consistent with exemplary embodiments relate to complex spatial light modulators capable of modulating both a phase and an amplitude of light, and three-dimensional (3D) image displays including the complex spatial light modulators.

2. Description of the Related Art

Recently, with the release of three-dimensional (3D) movies, extensive research has been conducted regarding technologies related to 3D image displays. A 3D image display displays 3D images based on binocular parallax. Thus, a current commercialized 3D image display uses binocular parallax to provide a left-eye image and a right-eye image, which have different viewpoints, to a left eye and a right eye of a viewer, respectively, thereby allowing the viewer to experience 3D effects. Examples of 3D image displays are a stereoscopic 3D image display that uses special glasses and an autostereoscopic 3D image display that does not use glasses.

However, when viewers view 3D images displayed based on binocular parallax, the viewers' eyes may become tired. Also, a 3D image display, which provides only a viewpoint of a left-eye image and a viewpoint of a right-eye image, is limited in its ability to provide a natural 3D effect, because it fails to account for a viewpoint change caused by the movement of a viewer.

Holographic 3D image displays have been researched in order to display more realistic 3D images. However, a device capable of controlling both the amplitude and phase of light is necessary to implement a holographic 3D image display. When images are displayed by using a device capable of controlling only one of the amplitude (brightness) and phase of light, an image quality may be degraded by zero-order diffracted light, twin images, speckles, or the like.

SUMMARY

One or more exemplary embodiments may provide complex spatial light modulators that may control both an amplitude and a phase of light.

One or more exemplary embodiments may provide holographic three-dimensional (3D) image displays that display 3D images by using complex spatial light modulators that may control both an amplitude and a phase of light.

Additional aspects will be set forth in part in the description which follows and, in part, will be apparent from the description, or may be learned by practice of the exemplary embodiments.

According to an aspect of an exemplary embodiment, a complex spatial light modulator includes: a spatial light modulator configured to modulate an amplitude of a light beam; a prism array disposed on an optical path after the spatial light modulator and including an array of prism sets each prism set including a first prism section, a flat portion, and a second prism section; and a diffractive device configured to diffract light that has passed through the prism array.

The first prism section may include a first base and a first prism portion, and the second prism section may include a second base and a second prism portion.

A thickness of the first base, a thickness of the second base, and a thickness of the flat portion are different from one another.

The spatial light modulator may include a plurality of pixels, each pixel comprising a first sub-pixel corresponding to the first prism section, a second sub-pixel corresponding to the flat portion, and a third sub-pixel corresponding to the second prism section, wherein a center line of the first prism section may coincide with a center line of the first sub-pixel, a center line of the flat portion may coincide with a center line of the second sub-pixel, and a center line of the second prism section may coincide with a center line of the third sub-pixel.

A thickness of the first base, a thickness of the second base, and a thickness of the flat portion are equal to one another.

The spatial light modulator may include a plurality of pixels, each pixel comprising a first sub-pixel corresponding to the first prism section, a second sub-pixel corresponding to the flat portion, and a third sub-pixel corresponding to the second prism section, wherein a center line of the first prism section may be shifted from a center line of the first sub-pixel, a center line of the flat portion may be shifted from a center line of the second sub-pixel, and a center line of the second prism section may be shifted from a center line of the third sub-pixel.

The first prism section, the flat portion, and the second prism section may be configured to change the phases of a first light beam, a second light beam, and a third light beam, respectively, that have passed through the first prism section, the flat portion, and the second prism section.

A phase difference between the first light beam and the second light beam, a phase difference between the second light beam and the third light beam, and a phase difference between the third light beam and the first light beam may be about 120°.

A prism angle of the first prism portion is equal to a prism angle of the second prism portion.

A first light beam that has passed through the first prism section, a second light beam that has passed through the flat portion, and a third light beam that has passed through the second prism section may be combined by the diffractive device.

A first light beam that has passed through the first prism section may be combined with a (−1)-order light diffracted by the diffractive device, a second light beam that has passed through the flat portion may be combined with a 0-order light diffracted by the diffractive device, and a third light beam that has passed through the second prism section may be combined with a (+1)-order light beam diffracted by the diffractive device.

At least one of the first prism portion and the second prism portion may include a micro prism array.

A distance between the prism array and the diffractive device may satisfy an equation $h=T/\tan\theta$, where h denotes a distance between the prism array and the diffractive device, T denotes a pixel pitch of the spatial light modulator, and $\theta$ denotes an incidence angle of a light beam incident on the diffractive device.

According to an aspect of another exemplary embodiment, a 3D image display includes: a light source unit configured to output light; a spatial light modulator configured to modulate a phase of the light output by the light source unit; an image signal circuit unit configured to input an image signal to the spatial light modulator; and a beam combiner configured to modulate a phase and an amplitude of light incident thereon from the spatial light modulator, wherein the beam combiner is disposed on an optical path after the spatial light modulator and includes: a prism array including an array of prism sets each including a first prism section, a flat portion, and a second prism section; and a diffractive device configured to diffract light that has passed through the prism array.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
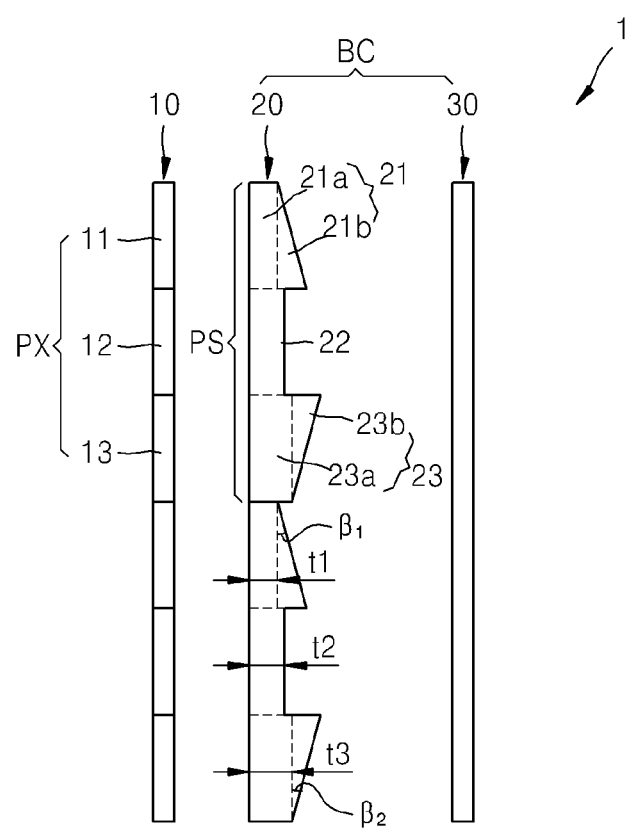
FIG. 1 is a cross-sectional view of a complex spatial light modulator according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, expressions such as "at least one of," when preceding a list of elements, modify the entire list of elements and do not modify the individual elements of the list.

Hereinafter, complex spatial light modulators according to exemplary embodiments and a three-dimensional (3D) image display including the complex spatial light modulators will be described in detail with reference to the accompanying drawings. In the drawings, like reference numerals denote like elements, and the sizes or thicknesses of elements are exaggerated for convenience of description.

FIG. 1 is a cross-sectional view of a complex spatial light modulator 1 according to an exemplary embodiment. Referring to FIG. 1, the complex spatial light modulator 1 may include a spatial light modulator 10 that modulates an amplitude of a light beam, and a beam combiner BC that combines light beams output from the spatial light modulator 1. The beam combiner BC may include a prism array 20 and a diffractive device 30.

The spatial light modulator 10 may include a photoelectric device that may change refractivity by using an electrical signal. The spatial light modulator 10 may include, for example, a photoelectric material layer such as a liquid crystal layer. When a voltage is applied to the spatial light modulator 10, the spatial light modulator 10 may control an amplitude of a light beam output by changing the refractivity of the liquid crystal layer. For example, the spatial light modulator 10 may include a polymer dispersed liquid crystal layer. An optical path length may be changed according to a voltage applied to the polymer dispersed liquid crystal layer, and an amplitude of light beam may be modulated accordingly.

The spatial light modulator 10 may include a plurality of pixels PX. For example, the pixel PX may include a first sub-pixel 11, a second sub-pixel 12, and a third sub-pixel 13, and the first sub-pixel 11, the second sub-pixel 12, and the third sub-pixel 13 may be arranged in a two-dimensional (2D) matrix configuration. The prism array 20 may include prism sets PS, and the prism sets PS may be, likewise, arranged periodically i in a two-dimensional (2D) matrix configuration. For example, the prism sets PS may include a first prism section 21, a flat portion 22, and a second prism section 23. The first prism section 21, the flat portion 22, and the second prism section 23 may be configured to generate an optical path difference and thus a phase difference between light beams that have passed through the first prism section 21, the flat portion 22, and the second prism section 23. The first prism section 21 may include a first base 21a and a first prism portion 21b, and the second prism section 23 may include a second base 23a and a second prism portion 23b. In order to generate an optical path difference between light passing through the first prism section 21 and light passing through the second prism section 23, a thickness t1 of the first base 21a may be different from a thickness t3 of the second base 23a. For example, the first base 21a and the second base 23a may be portions of the first prism portion 21b and the second prism portion 23b, respectively, that do have not prism surfaces. An optical path difference between the light passing through the first prism section 21 and the light passing through the second prism section 23 may be generated by the first prism section 21, the flat portion 22, and the second prism section 23. The phases of a first light beam, a second light beam, and a third light beam, which pass through the first prism section 21, the flat portion 22, and the second prism section 23, may be modulated by the optical path difference. Accordingly, a phase difference may be generated between the first light beam, the second light beam, and the third light beam. For example, the phases of the first light beam, the second light beam, and the third light beam may be modulated such that a phase difference between the first light beam and the second light beam, a phase difference between the second light beam and the third light beam, and a phase difference between the third light beam and the first light beam are each about 120°.

Figure 2:
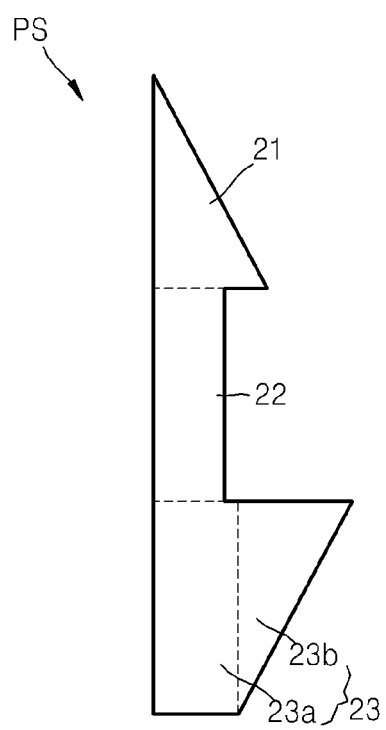
FIG. 2 is a diagram illustrating an example of a prism set of the complex spatial light modulator according to an exemplary embodiment.

For example, the thickness t1 of the first base 21a may be smaller than the thickness t3 of the second base 23a. Also, a thickness t2 of the flat portion 22 may be different from the thickness t1 of the first base 21a and the thickness t3 of the second base 23a. For example, the thickness t1 of the first base 21a, the thickness t2 of the flat portion 22, and the thickness t3 of the second base 23a may satisfy (t1<t2<t3). However, embodiments are not limited thereto. For example, as illustrated in FIG. 2, a first prism section 21 may include a first prism portion without including a first base. That is, the thickness of the first base may be 0, and the thickness of the flat portion 22 may be smaller than the thickness of the second base 23a.

The first prism portion 21b may be the same shape and size as the second prism portion 23b. For example, a prism angle β1 of the first prism portion 21b may be equal to a prism angle β2 of the second prism portion 23*b*. Also, the first prism portion 21*b* and the second prism portion 23*b* may be arranged to face each other.

The pixel PX and the prism set PS may have a 1:1 correspondence with each other. The first sub-pixel 11 may correspond to the first prism section 21, the second sub-pixel 12 may correspond to the flat portion 22, and the third sub-pixel 13 may correspond to the second prism section 23. For example, a center line of the first sub-pixel 11 may coincide with a center line of the first prism section 21, a center line of the second sub-pixel 12 may coincide with a center line of the flat portion 22, and a center line of the third sub-pixel 13 may coincide with a center line of the second prism section 23.

Operations of the complex spatial light modulator 1 will be described with reference to FIG. 3. In the spatial light modulator 10, the first sub-pixel 11, the second sub-pixel 12, and the third sub-pixel 13 may constitute one pixel. A light beam L0 may be input to the spatial light modulator 10. An amplitude of the light beam L0 may be modulated by the spatial light modulator 10. A first light beam L1 that has passed through the first sub-pixel 11, a second light beam L2 that has passed through the second sub-pixel 12, and a third light beam L3 that has passed through the third sub-pixel 13 may have different amplitudes than one another. Thereafter, the phase of the first light beam L1 may be modulated when the first light beam L1 passes through the first prism section 21, the phase of the second light beam L2 may be modulated when the second light beam L2 passes through the flat portion 22, and the phase of the third light beam L3 may be modulated when the third light beam L3 passes through the second prism section 23.

For example, when the first light beam L1 has an amplitude A and a phase $\theta 1$, the second light beam L2 has an amplitude B and a phase 0, and the third light beam L3 has an amplitude C and a phase $\theta 2$, the first light beam L1, the second light beam L2, and the third light beam L3 may be represented in a complex space as expressed in Equation 1 below.

$$L1 = A \exp(i\theta 1)$$

$$L2 = B$$

$$L3 = C \exp(i\theta 2) \qquad \text{Equation 1}$$

An optical path difference may be generated due to a thickness difference between the first base 21*a* of the first prism section 21, the flat portion 22, and the second base 23*a* of the second prism section 23, and accordingly, a phase difference may be generated between the first light beam L1, the second light beam L2, and the third light beam L3. For example, a phase difference between the first light beam L1, the second light beam L2, and the third light beam L3 may be about 120°. For example, $\theta 1$ may be equal to about 120°, and $\theta 2$ may be equal to about −120°. A phase difference between the first light beam L1 and the second light beam L2, a phase difference between the second light beam L2 and the third light beam L3, and a phase difference between the third light beam L3 and the first light beam L1 may be about 120°.

Thereafter, the first light beam L1 may be refracted by the first prism portion 21*b*, the second light beam L2 may pass through the flat portion 22, and the third light beam L3 may be refracted by the second prism portion 23*b*. The first light beam L1, the second light beam L2, and the third light beam L3 are incident on the diffractive device 30.

The diffractive device 30 may include a plurality of grooves that are arranged at a predetermined pitch. A diffraction angle of a diffracted light beam may be controlled according to the predetermined pitch of the diffractive device 30. Also, a diffraction efficiency of the diffractive device 30 may be controlled by controlling the depth of the grooves. The diffraction efficiency of the diffractive device 30 may change according to a change in the incidence angle and the wavelength of an incident light beam. The diffractive device 30 may be designed to have a maximum diffraction efficiency with respect to the wavelength of a light beam and the incidence angle of a light beam incident on the diffractive device 30 through the prism array 20. Thus, a diffraction efficiency for a light beam having a wavelength and an incidence angle that do not correspond to the design conditions of the diffractive device 30 may be reduced. Therefore, the diffractive device 30 may be designed to have a high diffraction efficiency for the first light beam L1, the second light beam L2, and the third light beam L3 that have passed through the prism array 20. The first light beam L1, the second light beam L2, and the third light beam L3 may be combined by the diffractive device 30, to output a light beam whose phase and amplitude have both been modulated. The phase and amplitude of the light beam may be simultaneously modulated.

For example, by the diffractive device 30, the first light beam L1 may be diffracted into a 0-order light beam and a (±1)-order light beam, the second light beam L2 may be diffracted into a 0-order light beam and a (±1)-order light beam, and the third light beam L3 may be diffracted into a 0-order light beam and a (±1)-order light beam. A 0-order light beam L10 of the first light beam L1 may pass straight through the diffractive device 30, and a (−1)-order light beam L1(−1) of the first light beam L1 may be diffracted and travel in a vertical direction (Z-axis direction in FIG. 3) with respect to the diffractive device 30. A 0-order light beam L20 of the second light beam L2 passes through the diffractive device 30 and travels in the Z-axis direction. A 0-order light beam L30 of the third light beam L3 may pass straight through the diffractive device 30, and a (+1)-order light beam L3(+) of the third light beam L3 may travel in the Z-axis direction. Accordingly, the (−1)-order light beam L1(−1) of the first light beam L1, the 0-order light beam L20 of the second light beam L2, and the (+1)-order light beam L3(+) of the third light beam L3 may be combined. In other words, since light beams, which have passed through the first prism section 21, the flat portion 22, and the second prism section 23, are diffracted by the diffractive device 30 in a direction parallel to an optical axis, the light beams may be combined on one axis into a coherent complex modulated light wave. Accordingly, both the phase and amplitude of the light beam may be modulated. For example, the phase and amplitude of the light beam may be simultaneously modulated.

Figure 4:
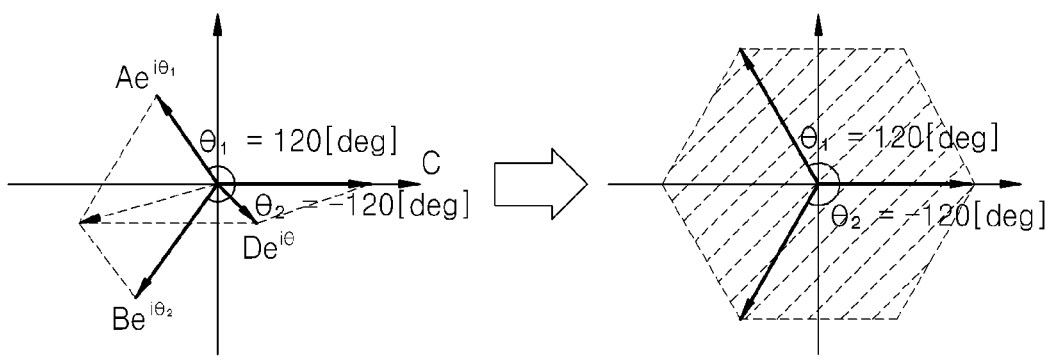
FIG. 4 illustrates that both an amplitude and a phase of a light beam are modulated by the complex spatial light modulator according to an exemplary embodiment.

FIG. 4 illustrates an exemplary embodiment in which three light beams L1, L2, and L3 (L1=A exp(i$\theta 1$), L2=B, L3=C exp(i$\theta 2$)), namely, first, second, and third light beams, are combined and modulated into a light beam Dexp(i$\theta$) having an amplitude D and a phase $\theta$. FIG. 4 also illustrates that an entire complex space may be represented when the phase difference between the first, second, and third light beams is about 120° and the amplitudes A, B, and C of the first, second, and third light beams are modulated.

Figure 5:
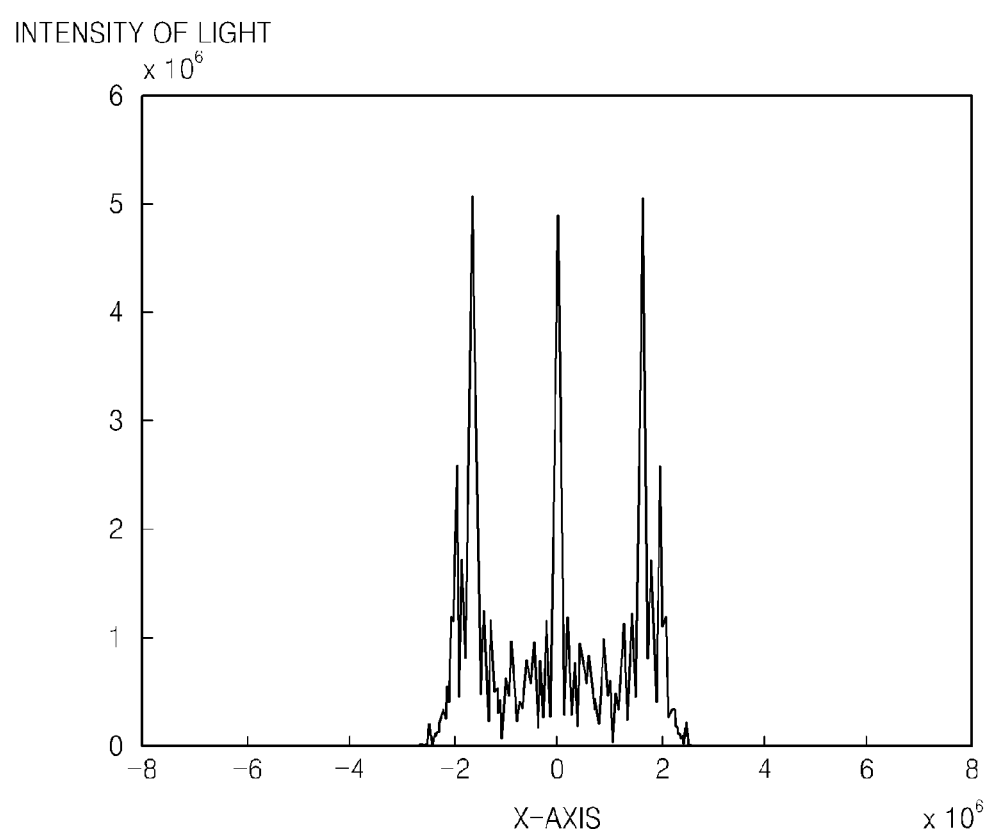
FIG. 5 illustrates the intensity of light in a direction (X-axis direction) of the complex spatial light modulator according to an exemplary embodiment.

FIG. 5 illustrates a change in the intensity of light in a direction (X-axis direction in FIG. 3) of the complex spatial light modulator 1 according to an exemplary embodiment. FIG. 5 shows that the first light beam, the second light beam, and the third light beam are output with similar light intensity.

In this manner, the complex spatial light modulator 1 according to the present embodiment may modulate both the amplitude and phase of a light beam.

Figure 3:
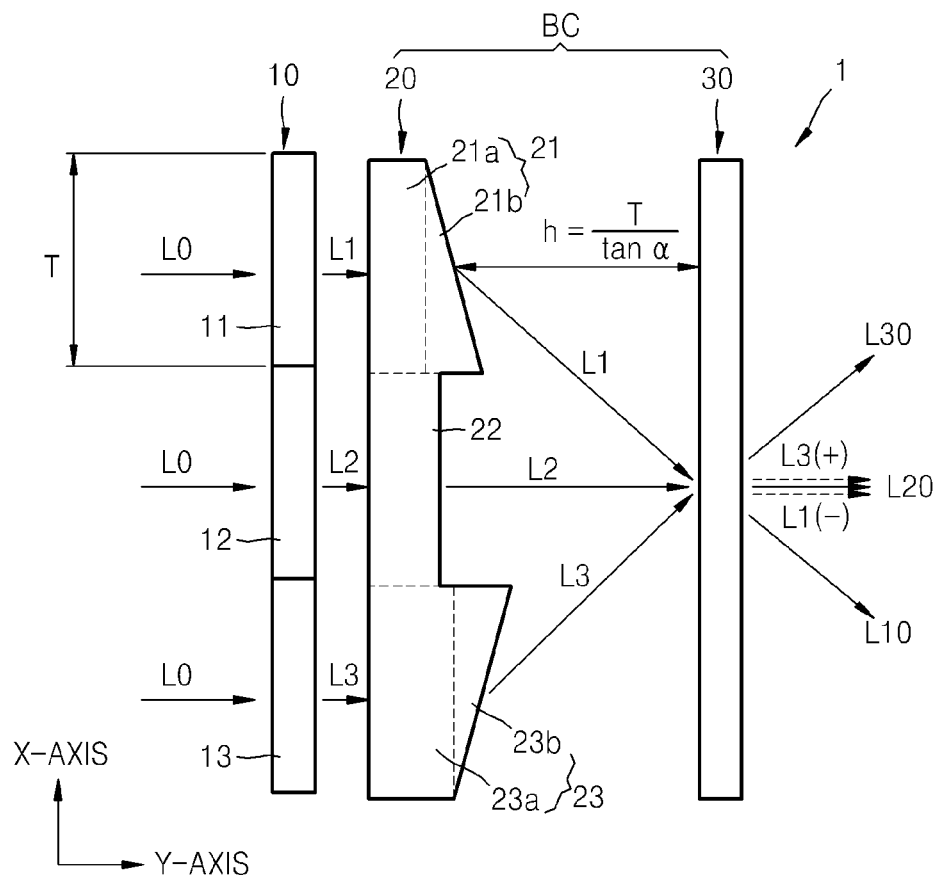
FIG. 3 is a diagram illustrating operations of the complex spatial light modulator illustrated in FIG. 1.

Referring to FIG. 3, a distance h between the prism array 20 and the diffractive device 30 may satisfy Equation 2 below.

$$h = T/\tan \alpha \qquad \text{Equation 2}$$

where h denotes the distance between the prism array and the diffractive device, T denotes a pixel pitch of the spatial light modulator, and α denotes an incidence angle of a light beam incident on the diffractive device.

Also, when a grating period of the diffractive device 30 is Λ, the grating period may be obtained according to Equation 3 below.

$$\Lambda = \lambda/\sin\alpha \qquad \text{Equation 3}$$

where λ denotes the wavelength of the first, second, and third light beams.

A diffraction efficiency of the diffractive device 30 may change according to a change in the incidence angle and the wavelength of the incident light beam. The diffractive device 30 may be designed to have a maximum diffraction efficiency with respect to the wavelength of a light beam and the incidence angle of a light beam incident on the diffractive device 30 through the prism array 20. For example, the diffractive device 30 may be designed to have a high diffraction efficiency for the (−1)-order light beam L1(−1) of the first light beam L1, the 0-order light beam L20 of the second light beam L2, and the (+1)-order light beam L3(+) of the third light beam L3 with respect to the first light beam L1, the second light beam L2, and the third light beam L3 that have passed through the prism array 20.

Since the diffractive device 30 is polarization-independent, the diffractive device 30 has a higher optical efficiency than a polarization-dependent device.

Figure 6:
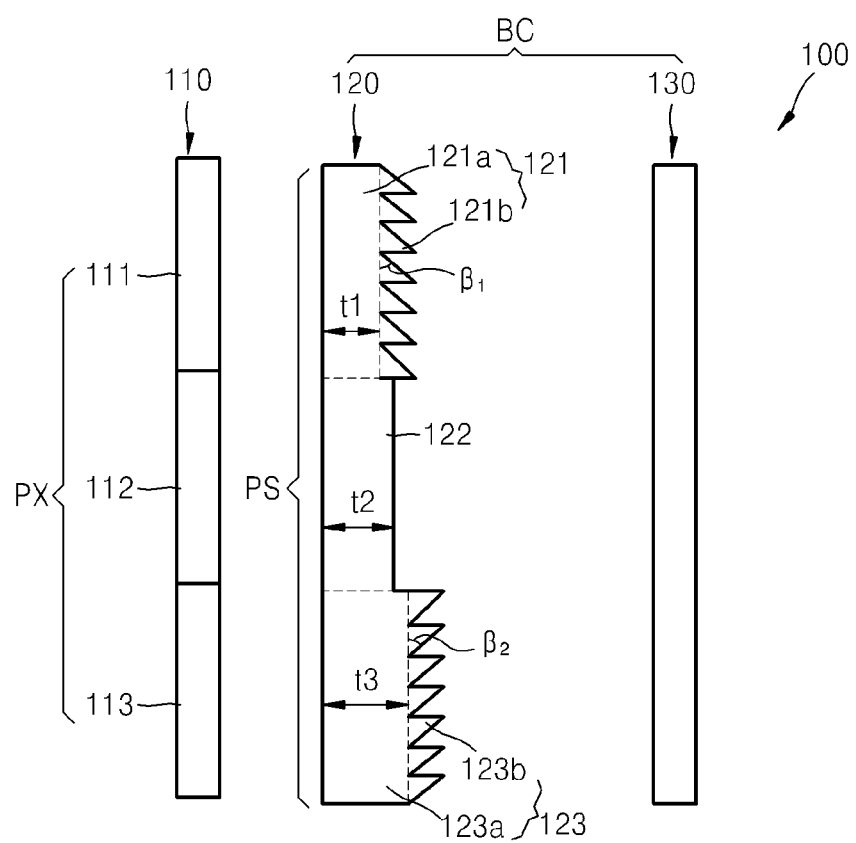
FIG. 6 is a cross-sectional view of a complex spatial light modulator according to another exemplary embodiment.

FIG. 6 is a cross-sectional view of a complex spatial light modulator 100 according to another exemplary embodiment. Referring to FIG. 6, the complex spatial light modulator 100 may include a spatial light modulator 110, that modulates an amplitude of a light beam, and a beam combiner BC that combines light beams output from the spatial light modulator 110. The beam combiner BC may include a prism array 120 and a diffractive device 130.

The spatial light modulator 110 may include a plurality of pixels PX. For example, each of the pixels PX may include a first sub-pixel 111, a second sub-pixel 112, and a third sub-pixel 113, and the first sub-pixel 111, the second sub-pixel 112, and the third sub-pixel 113 may be arranged in a 2D matrix configuration. The prism array 120 may include prism sets PS, and each of the prism sets PS may be arranged periodically in a 2D matrix configuration. For example, the prism sets PS may each include a first prism section 121, a flat portion 122, and a second prism section 123. The first prism section 121 may include a first base 121a and a first prism portion 121b, and the second prism section 123 may include a second base 123a and a second prism portion 123b. At least one of the first prism portion 121b and the second prism portion 123b may include a micro prism array structure.

For example, the first prism portion 121b may include a first micro prism array, and the second prism portion 123b may include a second micro prism array. A micro prism of the first micro prism array may have the same shape and size as a micro prism of the second micro prism array. For example, a prism angle 131 of the micro prism of the first prism portion 121b may be equal to a prism angle 132 of the micro prism of the second prism portion 123b. Also, the micro prism of the first prism portion 121b and the micro prism of the second prism portion 123b may be arranged to face each other.

In order to generate an optical path difference between the first prism section 121 and the second prism section 123, a thickness t1 of the first base 121a may be different from a thickness t3 of the second base 123a. An optical path difference may be generated by the first prism section 121, the flat portion 122, and the second prism section 123, and the phases of a first light beam, a second light beam, and a third light beam, which have passed through the first prism section 121, the flat portion 122, and the second prism section 123, may be modulated due to the optical path difference. Accordingly, a phase difference may be generated between the first light beam, the second light beam, and the third light beam. For example, the phases of the first light beam, the second light beam, and the third light beam may be modulated such that a phase difference between the first light beam and the second light beam, a phase difference between the second light beam and the third light beam, and a phase difference between the third light beam and the first light are each about 120°.

For example, the thickness t1 of the first base 121a may be smaller than the thickness t3 of the second base 123a. Also, a thickness t2 of the flat portion 122 may be different from the thickness t1 of the first base 121a and the thickness t3 of the second base 123a. For example, the thickness t1 of the first base 21a, the thickness t2 of the flat portion 22, and the thickness t3 of the second base 23a may satisfy (t1<t2<t3). However, embodiments are not limited thereto.

An amplitude of a light beam may be modulated by the spatial light modulator 110, and a phase of a light beam may be modulated by the prism array 120. Since beams, which have passed through the prism array 120, are combined by the diffractive device 130, both the amplitude and phase of each light beam may be modulated. The functions and operations of the prism array 120 and the diffractive device 130 may be substantially identical to those described with reference to FIGS. 1 and 2.

Figure 7:
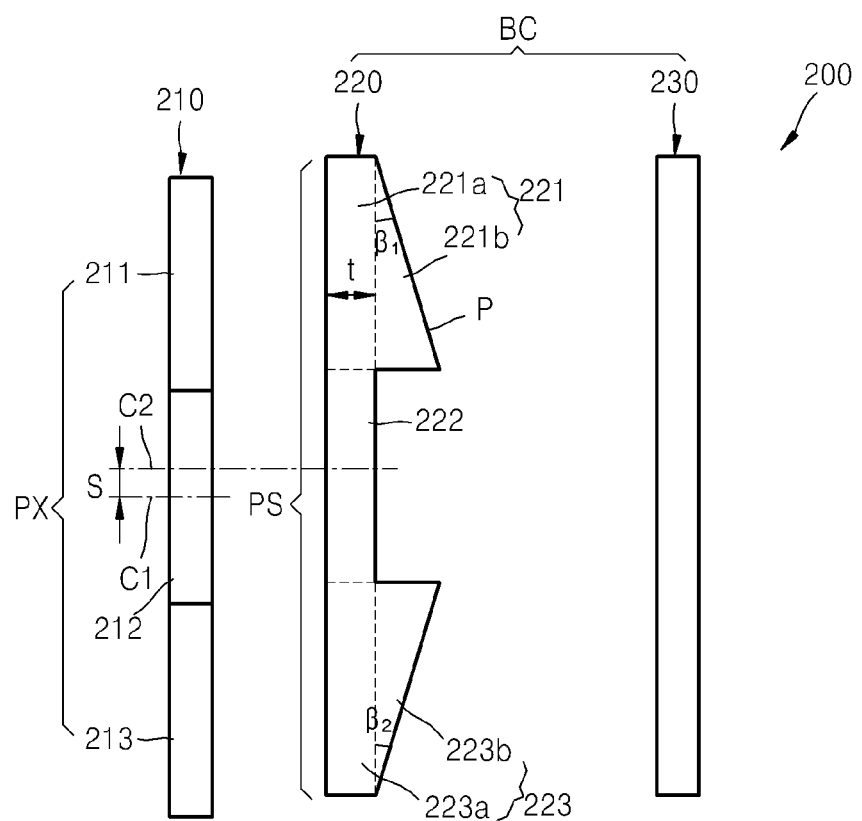
FIG. 7 is a cross-sectional view of a complex spatial light modulator according to another exemplary embodiment.

FIG. 7 is a cross-sectional view of a complex spatial light modulator 200 according to another exemplary embodiment. Referring to FIG. 7, the complex spatial light modulator 200 may include a spatial light modulator 210 that modulates an amplitude of a light beam, and a beam combiner BC that combines light beams output from the spatial light modulator 210. The beam combiner BC may include a prism array 220 and a diffractive device 230.

The spatial light modulator 210 may include a plurality of pixels PX. For example, each of the pixels PX may include a first sub-pixel 211, a second sub-pixel 212, and a third sub-pixel 213, and the first sub-pixel 111, the second sub-pixel 112, and the third sub-pixel 113 may be arranged in a 2D matrix configuration. The prism array 220 may include prism sets PS, and each of the prism sets PS may be arranged periodically in a 2D matrix configuration. For example, each of the prism sets PS may include a first prism section 221, a flat portion 222, and a second prism section 223. The first prism section 221 may include a first base 221a and a first prism portion 221b, and the second prism section 223 may include a second base 223a and a second prism portion 223b.

The first base 221a, the flat portion 222, and the second base 223a may have equal thicknesses t. The first prism portion 221b may have the same shape and size as the second prism portion 223b. For example, a prism angle β1 of the first prism portion 221b may be equal to a prism angle β2 of the second prism portion 223b. Also, the first prism portion 221b and the second prism portion 223b may be arranged to face each other.

A center line C2 of the prism set PS may be shifted from a center line C1 of the pixel PX. For example, a center line of the first prism section 221 may be shifted from a center line of the first sub-pixel 211, a center line of the flat portion 222 may be shifted from a center line of the second sub-pixel 212, and a center line of the second prism section 223 may be shifted from a center line of the third sub-pixel 213. Accordingly, when a first light beam that has passed through the first sub-pixel 211, a second light beam that has passed through the second sub-pixel 212, and a third light beam that has passed through the third sub-pixel 213 pass through the first prism section 221, the flat portion 222, and the second prism section 223, respectively, an optical path difference may be generated therebetween. Accordingly, a phase difference may be generated between the first light beam, the second light beam, and the third light beam. For example, the phases of the first light beam, the second light beam, and the third light beam may be modulated such that a phase difference between the first light beam and the second light beam, a phase difference between the second light beam and the third light beam, and a phase difference between the third light beam and the first light beam are each about 120°.

An amplitude of a light beam may be modulated by the spatial light modulator 210, and a phase of a light beam may be modulated by the prism array 220. Since light beams which have passed through the prism array 220 are combined by the diffractive device 230, both the amplitude and phase of a light beam may be modulated. In the complex spatial light modulator 200 illustrated in FIG. 7, at least one of the first prism portion 221b and the second prism portion 223b may be replaced with a micro prism array structure (see FIG. 6).

As described above, in exemplary embodiments, the amplitude of a light beam may be modulated by the spatial light modulator, and both the amplitude and phase of a light beam may be modulated by the beam combiner BC. Therefore, it is possible to prevent a decrease in image quality due to twin images, speckles, or the like. Also, since the spatial light modulator and the beam combiner are arranged in parallel, an optical arrangement may be easily implemented. Also, since the spatial light modulator and the beam combiner may be manufactured and disposed to be thin, the thickness of the complex spatial light modulator may be reduced. Thus, the complex spatial light modulator may be applied to, for example, a flat panel display.

A complex spatial light modulator according to an exemplary embodiment may be applied to a holographic 3D image display to display realistic 3D images.

Figure 8:
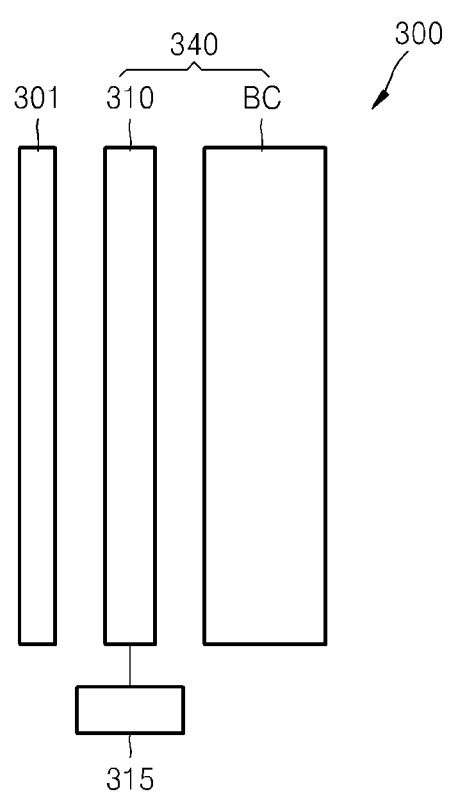
FIG. 8 is a schematic diagram illustrating a three-dimensional (3D) image display according to an exemplary embodiment.

FIG. 8 is a schematic diagram illustrating a 3D image display 300 according to an exemplary embodiment.

Referring to FIG. 8, the 3D image display 300 may include a light source unit 301 that irradiates a light beam, and a complex spatial light modulator 340 that displays a 3D image by using the light beam irradiated by the light source unit 301. The complex spatial light modulator 340 may include a spatial light modulator 310 that modulates an amplitude of a light beam, and a beam combiner BC that combines light beams output from the spatial light modulator 310 and modulates the phase and amplitude of a light beam. Also, the 3D image display 300 may include an image signal circuit unit 315 that is configured to input a holographic image signal to the spatial light modulator 310. The complex spatial light modulator 340 may be any one of the complex spatial light modulators 1, 100, and 200 described with reference to FIGS. 1 to 7. The complex spatial light modulator 340 may be manufactured to be thin, and may be used in a flat-panel holographic 3D image display to provide a high-quality 3D image.

Also, since the prism array used in the complex spatial light modulator according to an exemplary embodiment may be easily manufactured, production efficiency thereof may be improved.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the following claims.

What is claimed is:

1. A complex spatial light modulator comprising:
    a spatial light modulator configured to modulate an amplitude of light incident thereon;
    a prism array disposed such that light transmitted by the spatial light modulator is incident on the prism array, the prism array comprising an array of a plurality of prism sets, each of the plurality of prism sets comprising a first prism section, a flat portion, and a second prism section; and
    a diffractive device configured to diffract light transmitted by the prism array,
    wherein the diffractive device is configured to combine a first light beam transmitted through the first prism section, a second light beam transmitted through the flat portion, and a third light beam transmitted through the second prism section.

2. The complex spatial light modulator of claim 1, wherein the first prism section comprises a first base and a first prism portion, and the second prism section comprises a second base and a second prism portion.

3. The complex spatial light modulator of claim 2, wherein a thickness of the first base is different from a thickness of the second base, and a thickness of the flat portion is different from the thickness of the first base and the thickness of the second base.

4. The complex spatial light modulator of claim 3, wherein the spatial light modulator comprises a plurality of pixels corresponding to the plurality of prism sets of the prism array, wherein each of the plurality of pixels comprises a first sub-pixel corresponding to the first prism section of one of the plurality of prism sets, a second sub-pixel corresponding to the flat portion of one of the plurality of prism sets, and a third sub-pixel corresponding to the second prism section of one of the plurality of prism sets, for each of the plurality of prism sets:
    a center line of the first prism section coincides with a center line of the first sub-pixel of a corresponding one of the plurality of pixels,
    a center line of the flat portion coincides with a center line of the second sub-pixel of the corresponding one of one of the plurality of pixels, and
    a center line of the second prism section coincides with a center line of the third sub-pixel of the corresponding one of one of the plurality of pixels.

5. The complex spatial light modulator of claim 2, wherein a thickness of the first base is equal to a thickness of the second base and a thickness of the flat portion.

6. The complex spatial light modulator of claim 5, wherein the spatial light modulator comprises a plurality of pixels corresponding to the plurality of prism sets of the prism array, wherein each of the plurality of pixels comprises a first sub-pixel corresponding to the first prism section of one of the plurality of prism sets, a second sub-pixel corresponding to the flat portion of one of the plurality of prism sets, and a third sub-pixel corresponding to the second prism section of one of the plurality of prism sets, for each of the plurality of prism sets:

a center line of the first prism section is shifted from a center line of the first sub-pixel of a corresponding one of the plurality of pixels, a center line of the flat portion is shifted from a center line of the second sub-pixel of the corresponding one of one of the plurality of pixels, and a center line of the second prism section is shifted from a center line of the third sub-pixel of the corresponding one of one of the plurality of pixels.

7. The complex spatial light modulator of claim 1, wherein at least one of the first prism section, the flat portion, and the second prism section is configured to change a phase of light transmitted therethrough.

8. The complex spatial light modulator of claim 7, wherein the first prism section, the flat portion, and the second prism section are configured such that a phase difference between a first light beam, transmitted through the first prism section, and a second light beam, transmitted through the flat portion, is about 120°; a phase difference between the second light beam and a third light beam, transmitted through the second prism section, is about 120°; and a phase difference between the third light beam and the first light beam is about 120°.

9. The complex spatial light modulator of claim 1, wherein a prism angle of the first prism portion is equal to a prism angle of the second prism portion.

10. The complex spatial light modulator of claim 1, wherein the diffractive device is configured to combine a first light beam transmitted through the first prism section with a (−1)-order light diffracted by the diffractive device, the diffractive device is configured to combine a second light beam transmitted through the flat portion with a 0-order light diffracted by the diffractive device, and the diffractive device is configured to combine a third light beam transmitted through the second prism section with a (+1)-order light diffracted by the diffractive device.

11. The complex spatial light modulator of claim 2, wherein at least one of the first prism portion and the second prism portion comprises a micro prism array.

12. The complex spatial light modulator of claim 1, wherein a distance between the prism array and the diffractive device satisfies a following equation:

$$h = T/\tan\theta$$

where h is a distance between the prism array and the diffractive device, T is a pixel pitch of the spatial light modulator, and θ is an incidence angle of light incident on the diffractive device.

13. A three-dimensional (3D) image display comprising:
a light source unit configured to output a light beam;
a spatial light modulator configured to modulate a phase of the light beam incident thereon from the light source unit;
an image signal circuit unit configured to input an image signal to the spatial light modulator; and
a beam combiner configured to modulate a phase and an amplitude of light incident thereon from the spatial light modulator,
wherein the beam combiner is disposed on an optical path after the spatial light modulator and comprises:
a prism array comprising an array of a plurality of prism sets, each of the plurality of prism sets comprising a first prism section, a flat portion, and a second prism section; and
a diffractive device configured to diffract light transmitted by the prism array, wherein the diffractive device is configured to combine a first light beam transmitted though the first prisim section, a second light beam transmitted through the flat portion, and a third light beam transmitted through the second prisim section.

14. The 3D image display of claim 13, wherein
the first prism section comprises a first base and a first prism portion, and
the second prism section comprises a second base and a second prism portion.

15. The 3D image display of claim 14, wherein a thickness of the first base is different from a thickness of the second base, and a thickness of the flat portion is different from the thickness of the first base and the thickness of the second base.

16. The 3D image display of claim 15, wherein
the spatial light modulator comprises a plurality of pixels corresponding to the plurality of prism sets of the prism array, wherein each of the plurality of pixels comprises a first sub-pixel corresponding to the first prism section of one of the plurality of prism sets, a second sub-pixel corresponding to the flat portion of one of the plurality of prism sets, and a third sub-pixel corresponding to the second prism section of one of the plurality of prism sets,
for each of the plurality of prism sets:
a center line of the first prism section coincides with a center line of the first sub-pixel of a corresponding one of the plurality of pixels,
a center line of the flat portion coincides with a center line of the second sub-pixel of the corresponding one of one of the plurality of pixels, and
a center line of the second prism section coincides with a center line of the third sub-pixel of the corresponding one of one of the plurality of pixels.

17. The 3D image display of claim 14, wherein a thickness of the first base is equal to a thickness of the second base and a thickness of the flat portion.

18. The 3D image display of claim 17, wherein
the spatial light modulator comprises a plurality of pixels corresponding to the plurality of prism sets of the prism array, wherein each of the plurality of pixels comprises a first sub-pixel corresponding to the first prism section of one of the plurality of prism sets, a second sub-pixel corresponding to the flat portion of one of the plurality of prism sets, and a third sub-pixel corresponding to the second prism section of one of the plurality of prism sets,
for each of the plurality of prism sets:
a center line of the first prism section is shifted from a center line of the first sub-pixel of a corresponding one of the plurality of pixels,
a center line of the flat portion is shifted from a center line of the second sub-pixel of the corresponding one of one of the plurality of pixels, and
a center line of the second prism section is shifted from a center line of the third sub-pixel of the corresponding one of one of the plurality of pixels.

19. The 3D image display of claim 13, wherein at least one of the first prism section, the flat portion, and the second prism section is configured to change a phase of light transmitted therethrough.

20. A complex spatial light modulator comprising:
a spatial light modulator which modulates an amplitude of light incident thereon;
a prism array disposed such that light transmitted by the spatial light modulator is incident on the prism array, the prism array comprising a plurality of first prism sections, a plurality of planar sections, and a plurality of second prism sections, wherein the plurality of first prism sections and the plurality of second prism sections modulate a phase of light transmitted therethrough; and a diffractive device which diffracts light transmitted by the prism array, and wherein the diffractive device is configured to combine light transmitted by the plurality of first prism sections, the plurality of planar sections, and the plurality of second prism sections, wherein the plurality of planar sections have a height less than that of each the plurality of first prism sections and the plurality of second prism sections.

* * * * *